Aug. 18, 1936.  J. VINCENT  2,051,762
SCOOTER
Filed Aug. 6, 1935  2 Sheets-Sheet 1
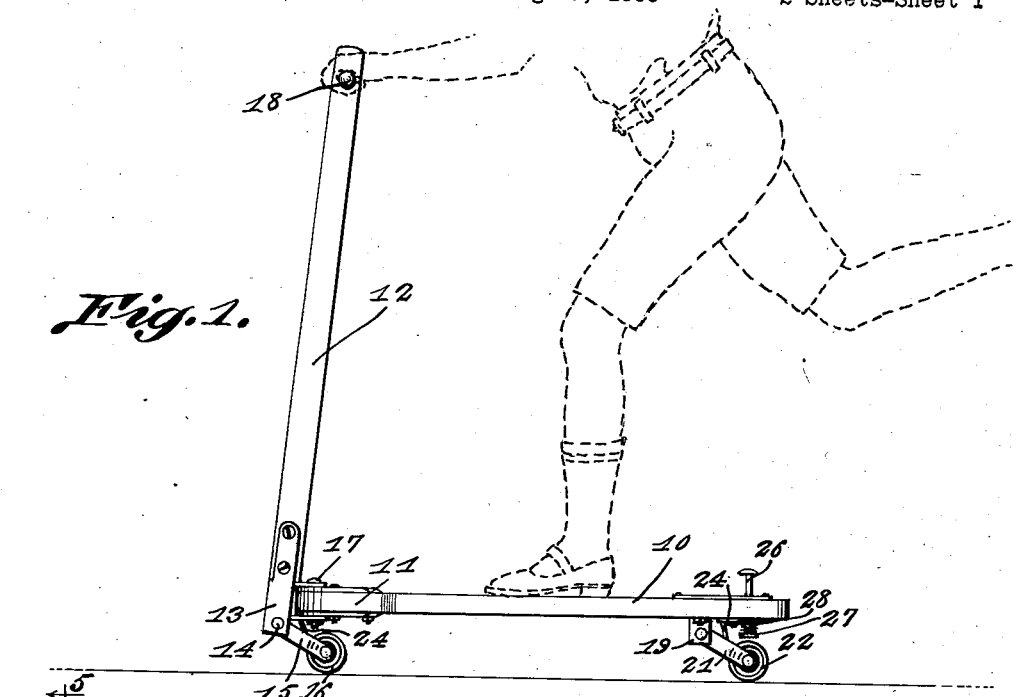
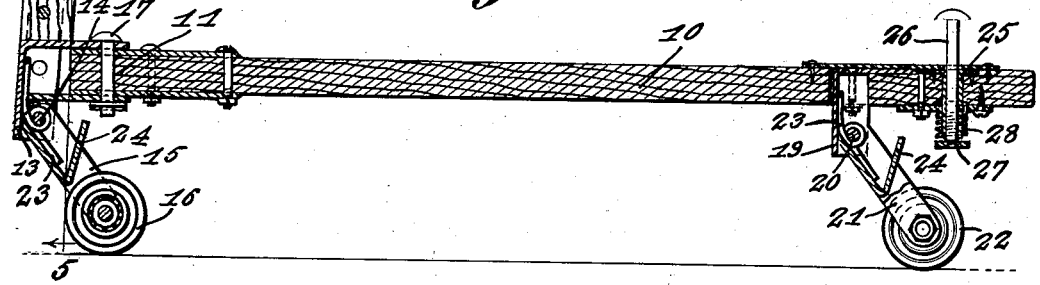
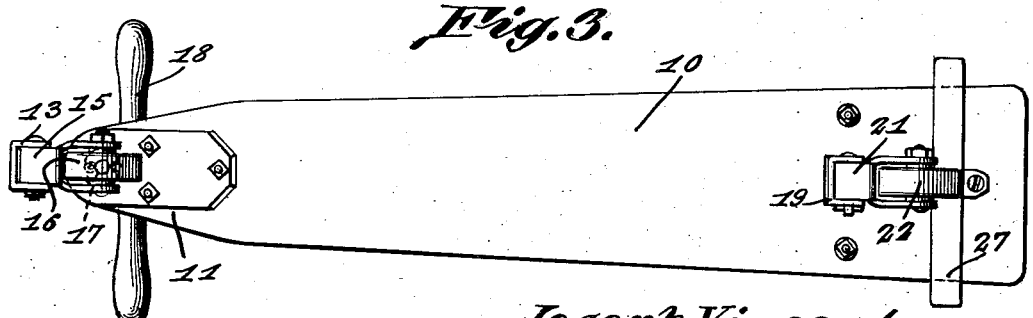
Joseph Vincent, INVENTOR
BY Victor J. Evans & Co.
ATTORNEY Aug. 18, 1936.    J. VINCENT    2,051,762
SCOOTER
Filed Aug. 6, 1935    2 Sheets-Sheet 2
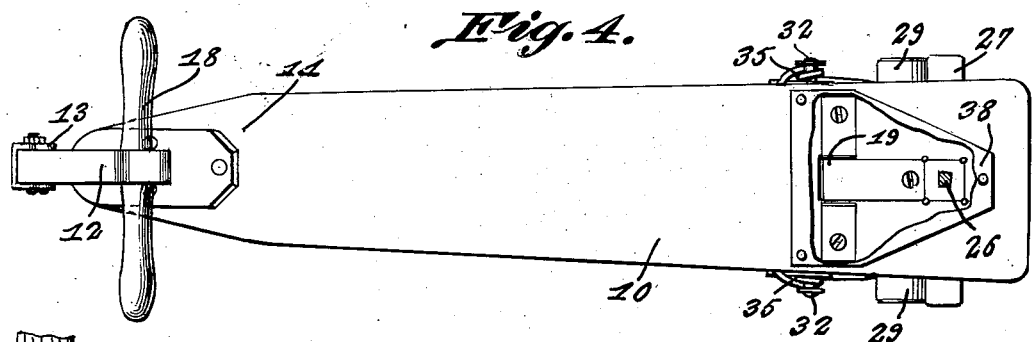
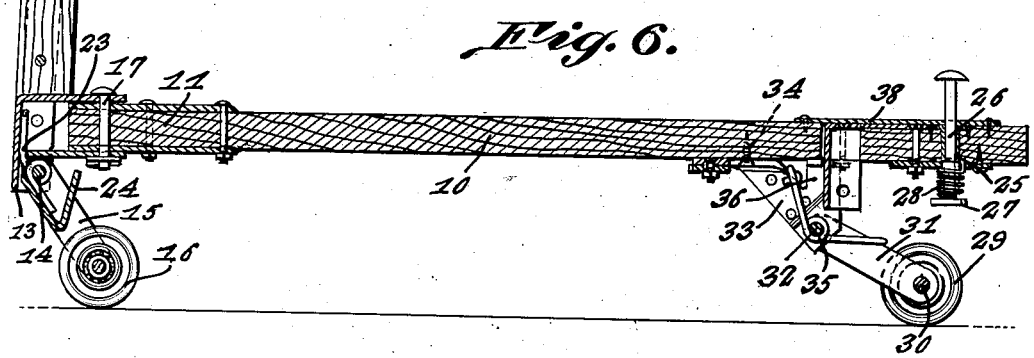
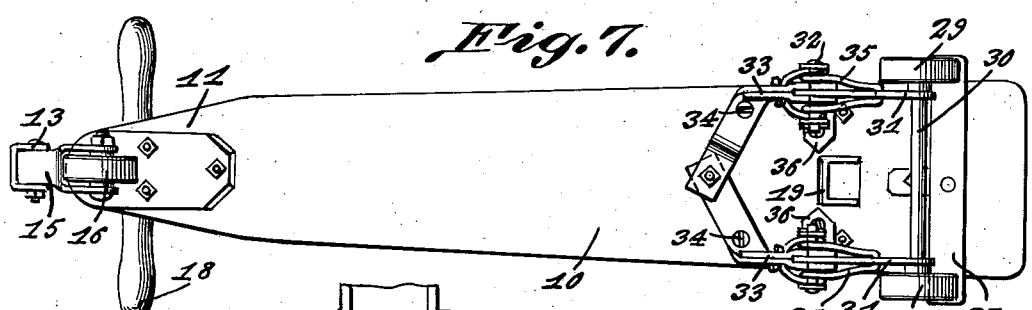
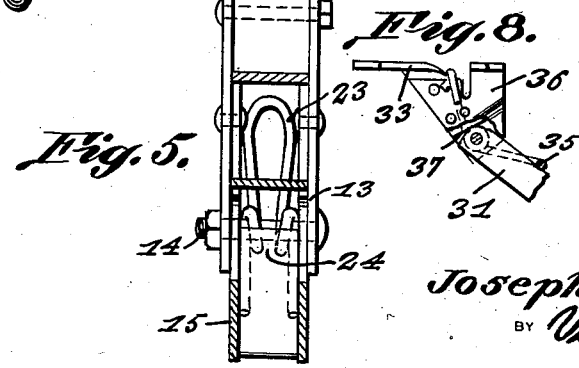
Joseph Vincent, INVENTOR
BY Victor J. Evans & Co.
ATTORNEY Patented Aug. 18, 1936

2,051,762

UNITED STATES PATENT OFFICE 2,051,762

SCOOTER

Joseph Vincent, Pittsburgh, Pa.

Application August 6, 1935, Serial No. 34,946

1 Claim. (Cl. 280—87.5)

The invention relates to wheeled vehicles and more especially to scooters or coasters for children's use.

The primary object of the invention is the provision of a vehicle of this character, wherein the body thereof is supported through knee action upon the wheels so that the vehicle when operated will be relieved of shocks and jars incident to its travel upon a surface and also assures greater ease in the operation thereof when propelled by the foot of an operator and is susceptible of flexibility to give comfort and pleasure to a user.

Another object of the invention is the provision of a vehicle of this character, wherein the construction thereof is novel in form as a rider through knee action of the vehicle is assured of smooth riding with jolts and jars at a minimum, the vehicle being more readily pedaled and thus enabling maximum speed of travel to be obtained with a high degree of riding comfort assured.

A further object of the invention is the provision of a vehicle of this character, which is simple in its construction, thoroughly reliable and efficient in its operation, strong, durable, easy of manipulation, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of a vehicle constructed in accordance with the invention.

Figure 2 is a vertical longitudinal sectional view thereof.

Figure 3 is a bottom plan view.

Figure 4 is a top plan view.

Figure 5 is a fragmentary sectional view on the line 5—5 of Figure 2 looking in the direction of the arrows.

Figure 6 is a view similar to Figure 2 showing a modification.

Figure 7 is a bottom plan view thereof.

Figure 8 is a fragmentary elevation of a hanger.

Figure 9 is a fragmentary vertical transverse sectional view showing in detail the mounting of the bearing for the single rear wheel mounting.

Similar reference characters indicate corresponding parts throughout the several views in the drawings.

Referring to the drawings in detail, particularly Figures 1 to 3 and 9, inclusive, the wheeled vehicle constituting the present invention is in the form of a scooter or coaster for children's use, it comprising a tread body in the form of a board 10 which is preferably made from a relatively narrow section of forwardly tapered contour and flat. Arranged at the forward or narrow end of the body is a steering column or post 12 which is preferably at a forward inclination, carrying at its lower end a bearing 13 in which is pivoted at 14 a vertically swinging front fork 15 having journaled therein the front steering wheel or roller 16. This steering wheel or roller is preferably equipped with ball bearings to minimize friction in the working thereof. The post or column 12 has coupling through the medium of a pivotal connection 17 with the forward end 11 of the body 10 of the vehicle and at the upper end of this post or column is a cross handle bar 18. The post or column 12 in its connection with the body 10 is for steering purposes.

At the rear or wider end of the body 10 and projecting beneath the bottom face thereof is a bearing 19 having projected at 20 therein a rear fork 21 in which is journaled the rear wheel or roller 22, this also being equipped with ball bearings.

The forks 15 and 21 are acted upon by tensioning springs 23, these being engaged about the pivots for the wheels or rollers carried by said forks and are mounted so that knee action results. The forks 15 and 21 are formed with upwardly directed stops 24 which limit the swing of the said forks and the lowering of the body 10 under knee action of such forks to avoid contact of the body with the wheels or rollers during the travel of the vehicle and thus retarding the propelling thereof for such travel.

The knee action absorbs shocks and jars in the use of the springs 23 when the vehicle is being used.

Arranged at the wider end of the body 10 rearwardly of the rear fork 21 is a suitable fitting 25 for a braking pedal 26 it having a shoe 27 for engaging the rear wheel or roller 22 for braking purposes. This pedal 26 is normally held in a raised or inactive position by a spring 22 co-operating therewith and by pressure of the foot of the user of the vehicle the shoe 27 can make contact with the rear wheel so that the vehicle may be held under control.

In Figures 4 to 8 of the drawings there is shown a slight modification of the invention, wherein in lieu of the rear single wheel or roller there is employed a pair of wheels or rollers 29 carried upon an axle 30 common thereto journaled in a pair of swinging arms 31 which are pivoted at 32 to a pair of hangers 33 secured to the under side of the body at 34. Engaged with the pivots 32 are the springs 35 which have action similar to the springs 23 so that knee action results in the use of the pair of wheels or rollers 29. The springs 35 tension the arms 31 for knee action thereof. The hangers 33 are fitted with braces 36, these providing stops 37 to limit the swing of the arms 31 under knee action.

The structure as shown in Figures 1 to 3 of the drawings requires knack in balancing when the vehicle is operated due to the fact that it is provided with the single front and rear wheels while the modified form is the three-wheeled type, a pair of wheels being located at the rear end and a single wheel at the front end of the vehicle.

Covering the bearing 19 at the top of the body 10 is a cover plate 38. There is no need for removal of this bearing 19 when converting the vehicle from the single rear wheel to the double rear wheel type.

What is claimed is:

A vehicle of the kind described comprising a a board-like body wheeled fore and aft thereof, a bearing pivoted to the fore end of said body for horizontal swinging movement, a front fork pivoted to said bearing and having the wheel at the fore end of said body journaled therein and adapted for vertical swinging movement, an upwardly directed stop cut and bent from the said fork and engageable with the under side of the bearing to limit the vertical swinging upwardly of said fork, and a tensioning spring fitted with the bearing and fork for urging the fork in a downward direction and normally sustaining the stop out of contact with the bearing.

JOSEPH VINCENT.